United States Patent [19]

Jostlein

[11] Patent Number: 4,913,447

[45] Date of Patent: Apr. 3, 1990

[54] DYNAMIC SEAL FOR ROTOR APPARATUS

[75] Inventor: Hans Jostlein, Naperville, Ill.

[73] Assignee: Universities Research Association, Inc., Batavia, Ill.

[21] Appl. No.: 326,281

[22] Filed: Mar. 21, 1989

[51] Int. Cl.$^4$ ............................................. E21B 33/00
[52] U.S. Cl. ..................................... 277/3; 277/135; 384/134
[58] Field of Search ..................... 277/3, 27, 29, 135, 277/95; 384/134, 478

[56] References Cited

U.S. PATENT DOCUMENTS

| | | | |
|---|---|---|---|
| 2,125,446 | 8/1938 | Hurtt | 384/134 |
| 2,661,494 | 12/1953 | Crookston et al. | |
| 3,256,603 | 6/1966 | White | |
| 3,324,552 | 6/1967 | Saffir | |
| 3,325,849 | 6/1967 | Waters | |
| 3,347,604 | 10/1967 | Lavelle et al. | 384/134 |
| 3,833,273 | 9/1974 | Rickley et al. | |
| 3,909,014 | 9/1975 | Loliger | 277/135 |
| 4,350,345 | 9/1982 | Kalan et al. | 277/3 |
| 4,627,627 | 12/1986 | Rohm | |

*Primary Examiner*—Lenard A. Footland
*Attorney, Agent, or Firm*—Neuman, Williams, Anderson & Olson

[57] ABSTRACT

A dynamic seal is disclosed which prevents foreign material from entering the air bearing for a rotor apparatus. The rotor apparatus includes a housing, a generally cylindrical rotor disposed within the housing and having a shoulder, a fluid stream and a flexible seal plate with an inner wall forming a generally circular hole. The seal plate is secured to the housing with the seal plate inner wall normally abutting the shoulder of the rotor. In operation, the fluid stream is directed in the bearing space defined by the housing and exterior surface of the rotor and displaces the seal plate inner wall from the shoulder. A method for preventing foreign material from entering the bearing space defined by a housing and the exterior surface of a generally cylindrical rotor is also disclosed. The method comprises securing a flexible seal plate to the housing, with the seal plate having an inner wall forming a generally circular hole that normally abuts a shoulder portion of the rotor. The method further comprises directing a fluid stream in the bearing space, thereby displacing the seal plate inner wall from the shoulder.

8 Claims, 1 Drawing Sheet

– 4,913,447 –

DYNAMIC SEAL FOR ROTOR APPARATUS

BACKGROUND OF THE INVENTION

The invention relates to a seal for use with a rotor apparatus. In particular, the invention relates to a dynamic seal that prevents foreign material from entering an air bearing for a cutting tool mounted on a rotor apparatus. In operation, the dynamic seal adds essentially no friction to the surface of the rotor carrying the cutting tool.

Air bearings are widely used with rotor-mounted cutting tools in drilling grinding, and routing applications. Air bearings have been found to possess advantages over ball bearings in certain applications. The operating life of ball bearings, for example, substantially decreases when rotational speeds of the rotor exceed approximately 60,000 revolutions per minute. Air bearings are therefore frequently substituted for ball bearings in such high speed applications.

Air bearings operate at varying pressures and in varying configurations. Typically, the air bearing operates by directing air into the bearing space along the surface of the rotor toward the cutting tool and through and air exhaust gap. The air exhaust gap is small, usually on the order of approximately 0.0002 inches.

It has been previously thought by tool designers in this field that the air exhaust flowing toward the cutting tool would prevent fragmentary scraps and debris ejected from the workpiece from entering the air bearing during the cutting operation. Tests have shown, however, that such debris in fact accumulates on the rotor surface and in the air bearing space, probably because of turbulence and eddy currents in the vicinity of the air exhaust gap. Such accumulation of debris greatly reduces the life of the air bearing and rotor, since the rotor is subject to sticking and requires constant cleaning to operate smoothly. Eventually, the rotor will freeze or seize up from the accumulation of debris.

OBJECTS OF THE INVENTION

Accordingly, a general object of the present invention is to prolong the useful life of a rotor apparatus.

Similarly, an object of the present invention is to provide a seal that prevents foreign material from entering the air bearing of a rotor apparatus.

An additional object of the present invention is to provide a seal that adds essentially no friction at the surface of the rotor.

Finally, an object of the present invention is to provide an inexpensive and easy-to-install remedy to the problem of debris accumulation in air bearings.

Other objects and advantages of the invention will become apparent upon reading the following description and appended claims, and upon reference to the accompanying drawings.

SUMMARY OF THE INVENTION

The above objects are accomplished by providing a rotor apparatus comprising a housing, a rotor, a fluid stream and a seal plate. The housing has a longitudinally extending bore formed therein. A generally cylindrical rotor rotatable about a longitudinal axis is disposed within the bore of the housing. The exterior surface of the rotor has a shoulder along at least a portion thereof which connects a radially broad end of the rotor and a radially narrow end of the rotor. A fluid stream is directed longitudinally in the bearing space defined by the bearing housing and the rotor's exterior surface. The source of the fluid stream originates toward the radially broad end of the rotor. A seal plate formed of flexible material is fixedly secured to the housing. The seal plate has a generally circular hole formed therein. The inner wall of the seal plate defining the hole abuts the shoulder when the fluid stream is inactivated. The inner wall of the seal plate is displaced from the shoulder when the fluid stream is activated. Entry of foreign material into the bearing space is thus inhibited.

In the preferred embodiment of the apparatus, the flexible material of which the seal is formed comprises a polymide material. The fluid stream preferably comprises a gas, most preferably atmospheric air.

The above objects are also accomplished by providing a method for preventing foreign material from entering the bearing space defined by a housing having a longitudinally extending bore formed therein and a generally cylindrical rotor rotatable within the bore. The exterior surface of the rotor has a shoulder along at least a portion thereof which connects a radially broad end of the rotor and a radially narrow end of the rotor. The method comprises securing a seal plate formed of flexible material to the housing and directing a fluid stream longitudinally within the bearing space. The seal plate has a generally circular hole formed therein. The inner wall of the seal plate defining the hole normally abuts the shoulder. The source of the fluid stream originates toward the radially broad end of the rotor. The fluid stream displaces the inner wall of the seal plate away from the shoulder, thereby preventing foreign material from entering the bearing space.

In the preferred embodiment of the method, the flexible material of which the seal plate is formed comprises a polymide material. The fluid stream preferably comprises a gas, most preferably atmospheric air.

A particular advantage of the present invention is that the seal plate is easy to manufacture and easy to install and retrofit into existing cutting spindles. Further, the seal plate requires no separate air supply dedicated to ejecting foreign material and infrequent maintenance.

It should be understood that the drawings are not necessarily to scale.

DETAILED DESCRIPTION OF THE PREFERRED EMBODIMENT

Figure 1:
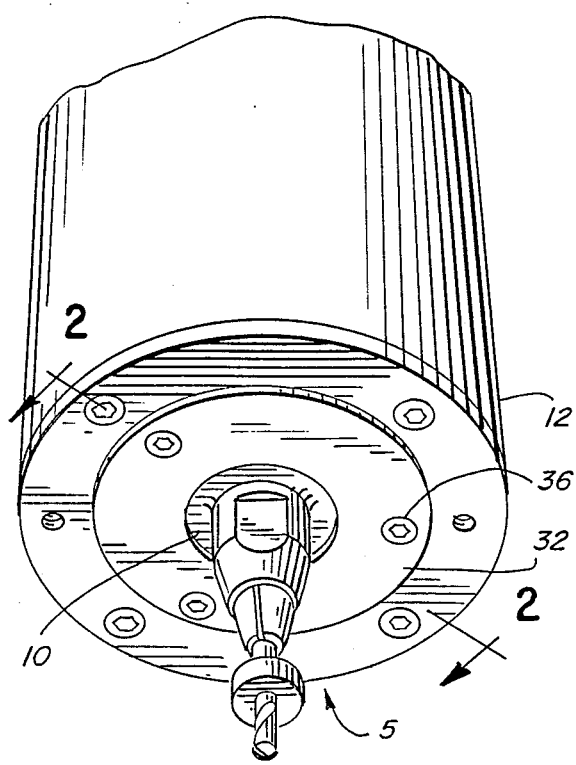
FIG. 1 is a perspective view of the bottom of a rotor apparatus incorporating one embodiment of the dynamic air bearing seal of the present invention.

Referring now to FIG. 1, a rotor apparatus embodying the present invention is generally designated by the numeral 5. Rotor apparatus 5 includes seal plate 10 which is secured to the housing 12 of rotor apparatus 5 by a sealing ring 32. In the illustrated embodiment, sealing ring 32 is secured to housing 12 by set screw 36.

Figure 2:
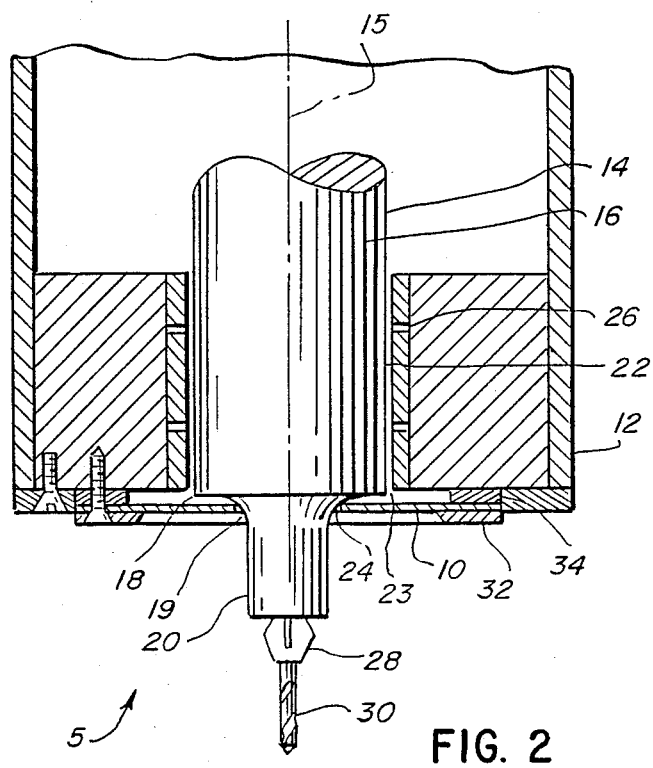
FIG. 2 is a schematic cross sectional view of the rotor apparatus taken along the line of 2—2 of FIG. 1.

FIG. 2 shows rotor apparatus 5 comprising rotor 16 which rotates about longitudinal axis 15. Rotor 16 is fitted into a generally cylindrical bore 14 in housing 12.

In accordance with the illustrated embodiment, rotor 16 further comprises at least a portion in the form of a shoulder 19. Shoulder 19 connects a radially broad portion 18 of rotor 16 and a radially narrow portion 20 of rotor 16. A cutting tool 30 is located at the end of radially narrow portion 20 of rotor 16. A collet socketing neck 28 secures cutting tool 30 in its proper cutting position.

As shown in FIG. 2, a bearing space 22 surrounds rotor 16 within housing 12 of rotor apparatus 5. Bearing space 22 generally extends between exterior surface of rotor 16 and interior surface of housing 12. In operation, a fluid stream, for example pressurized air, is directed longitudinally along the exterior surface of rotor 16 within bearing space 22. A source of the fluid stream is shown in FIG. 2 as outlet port 26. The source of the fluid stream is oriented such that the stream is directed from radially broad portion 18 of rotor 16 toward radially narrow portion 20 of rotor 16. The fluid stream escapes from bearing space 22 at air exhaust gap 23. Gap 23 is typically about 0.0002 inches wide.

Prior to the present invention, it was thought that the air stream escaping from a very narrow exhaust space like gap 23 would prevent foreign material, namely fragmentary debris from cutting tool 30 and the workpiece (not shown), from entering bearing space 22. However, before the addition of seal plate 10 in FIG. 2, air turbulence in the vicinity of the air exhaust gap 23 allowed debris to enter bearing space 22.

As indicated above, seal plate 10 prevents debris from entering bearing space 22 in rotor apparatus 5. Seal plate 10 is preferably formed of a flexible material, most preferably polyimide foil. The inner wall 24 of seal plate 10 defines a generally circular hole sized to abut against shoulder 19 when the fluid stream is not flowing. Seal plate 10 may dish slightly downward toward the radially narrow portion 20 of rotor 16, exerting a slight force against shoulder 19. Thus, seal plate 10 rests against the shoulder 19 when the fluid stream is inactive.

In operation, when rotor 16 is rotating and the fluid stream begins to flow, the inner wall 24 of seal plate 10 is urged in a longitudinally downward direction, thereby creating a slight radial distance between shoulder 19 and seal plate inner wall 24. Thus, during operation the fluid stream escapes from the gap formed between shoulder 19 and seal plate inner wall 24 toward cutting tool 30. The flexibility of seal plate 10 precisely controls the size of the gap between shoulder 19 and seal plate inner wall 24, and thereby prevents debris and other fragmentary material from entering bearing space 22. Moreover, in operation, seal plate 10 adds essentially no friction at the surface of rotor 16 since it does not contact rotor 16.

Figure 3:
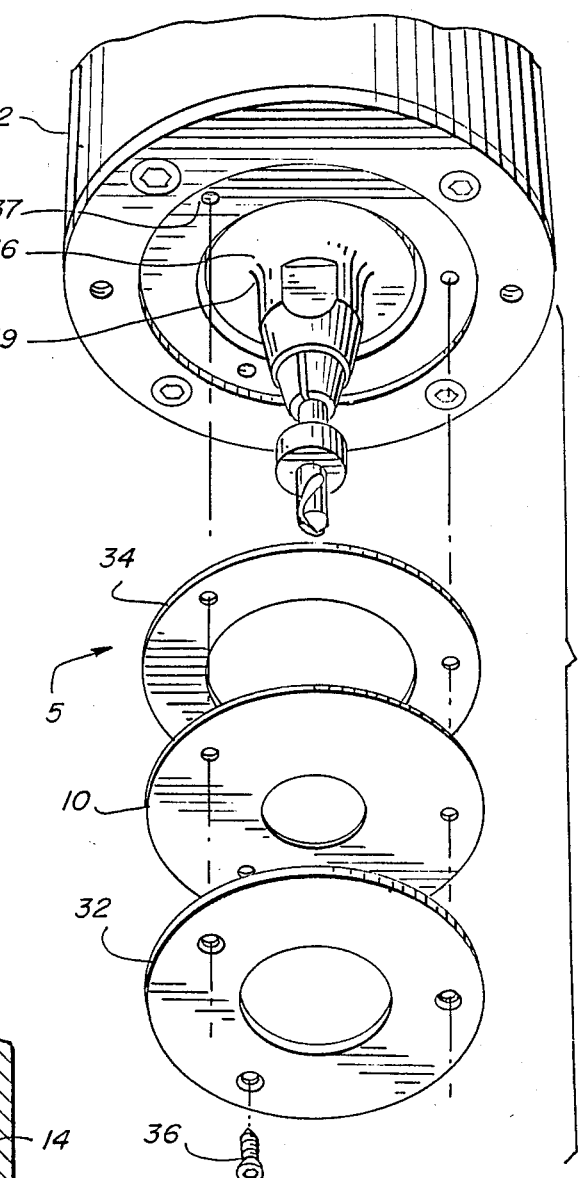
FIG. 3 is an exploded perspective view of the embodiment of FIG. 1, showing the flexible seal plate in a partially disassembled state.

FIG. 3 illustrates the simple construction associated with the present invention. As shown in FIG. 3, seal plate 10 is readily installed, usually requiring little or no skilled labor. Seal plate 10 may be adapted to an existing air bearing rotor apparatus with the use of a spacing ring 34 and a sealing ring 32, seal plate 10 being placed between sealing ring 32 and spacing ring 34. Seal plate 10 is then secured to housing 12 of rotor apparatus 5 using three spaced set screws, one of which is shown in FIG. 3 as set screw 36. As shown in FIG. 3, the set screws are inserted through sealing ring 32, seal plate 10, and spacing ring 34. The set screws mate with threaded holes formed in the underside of housing 12, one of which is shown in FIG. 3 as threaded hole 37. Of course, seal plate 10 could be secured to housing 12 by means other than set screws, such as riveting means or clamping means. The purpose of spacing ring 34 is to achieve proper spacing of seal plate 10 with respect to shoulder 19 of rotor 16. Using the illustrated construction, seal plate 10, spacing ring 34, and sealing ring 32 can be readily removed when rotor apparatus 5 is disassembled for periodic cleaning, tool changeover and storage.

The present invention has a particular application in the routing of plastic materials, particularly those incorporating glass fibers. The invention could also be employed in most grinding applications in which fine powders or shavings are ejected from the workpiece.

While a particular embodiment of the invention has been shown and described, it will be understood, of course, that the invention is not limited thereto, since modifications may be made and other embodiments of the principles of this invention will occur to those skilled in the art to which this invention pertains, particularly upon considering the foregoing teachings.

What is claimed is:

1. A rotor apparatus comprising:
   a housing having a longitudinally extending bore formed therein;
   a generally cylindrical rotor rotatable within said bore about a longitudinal axis, the exterior surface of said rotor having a shoulder along at least a portion thereof, said shoulder connecting a radially broad end and a radially narrow end of said rotor;
   means providing a fluid stream directed longitudinally in the bearing space defined by said housing and said rotor exterior surface, the source of said fluid stream originating toward the radially broad end of said rotor;
   a seal plate fixedly secured to said housing, said seal plate having a generally circular hole formed therein, said seal plate formed of flexible material, the inner wall of said seal plate defining said hole normally abutting said shoulder when said fluid stream is inactivated, said inner wall displaced from said shoulder when said fluid stream is activated, whereby entry of foreign material into said bearing space is inhibited.

2. The rotor apparatus of claim 1, wherein said flexible material comprises a polyimide material.

3. The rotor apparatus of claim 1, wherein said fluid stream comprises a gas.

4. The rotor apparatus of claim 3, wherein said gas comprises pressurized air.

5. A method for preventing foreign material from entering the bearing space defined by a housing having a longitudinally extending bore formed therein and a generally cylindrical rotor rotatable within said bore, the exterior surface of said rotor having a shoulder along at least a portion thereof, said shoulder connecting a radially broad end and a radially narrow end of said rotor, said method comprising:
   securing a seal plate formed of flexible material to said housing, said seal plate having a generally circular hole formed therein, the inner wall of the said seal plate defining said hole normally abutting said shoulder;
   directing a fluid stream longitudinally within said bearing space, the source of said fluid stream originating toward the radially broad end of said rotor, said fluid stream displacing said inner wall away from said shoulder.

6. The method of claim 5, wherein said flexible material comprises a polymide material.

7. The method of claim 5, wherein said fluid stream comprises a gas.

8. The method of claim 7, wherein said gas comprises atmospheric air.

* * * * *